(12) United States Patent
Kikuchi et al.

(10) Patent No.: US 12,351,234 B2
(45) Date of Patent: Jul. 8, 2025

(54) CRAWLER-TYPE WORK MACHINE

(71) Applicant: KOMATSU LTD., Tokyo (JP)

(72) Inventors: Yoshitaka Kikuchi, Tokyo (JP);
Hiroaki Takeshima, Tokyo (JP);
Takeshi Yoshikawa, Tokyo (JP)

(73) Assignee: KOMATSU LTD., Tokyo (JP)

( * ) Notice: Subject to any disclaimer, the term of this patent is extended or adjusted under 35 U.S.C. 154(b) by 861 days.

(21) Appl. No.: 17/622,098

(22) PCT Filed: Jun. 29, 2020

(86) PCT No.: PCT/JP2020/025575
§ 371 (c)(1),
(2) Date: Dec. 22, 2021

(87) PCT Pub. No.: WO2021/039095
PCT Pub. Date: Mar. 4, 2021

(65) Prior Publication Data
US 2022/0242483 A1    Aug. 4, 2022

(30) Foreign Application Priority Data

Aug. 30, 2019    (JP) .................................. 2019-158994

(51) Int. Cl.
*B62D 11/08*    (2006.01)
*B62D 11/18*    (2006.01)
*E02F 9/22*    (2006.01)

(52) U.S. Cl.
CPC ............ *B62D 11/08* (2013.01); *B62D 11/183* (2013.01); *E02F 9/22* (2013.01)

(58) Field of Classification Search
CPC ......... B62D 11/08; B62D 11/183; E02F 9/22; E02F 9/202; E02F 9/2083; E02F 9/2087; E02F 3/7604
See application file for complete search history.

(56) References Cited

U.S. PATENT DOCUMENTS 1,353,606 A * 9/1920 Nichols .................. B62D 11/08
192/13 R
1,422,375 A * 7/1922 Henry .................... B62D 11/08
192/21

(Continued)

FOREIGN PATENT DOCUMENTS

CN    1378938 A    11/2002
CN    103534467 A    1/2014

(Continued)

OTHER PUBLICATIONS

The Office Action for the corresponding Japanese application No. 2021-542577, issued on Nov. 7, 2023.

(Continued)

*Primary Examiner* — Valentin Neacsu
*Assistant Examiner* — Abigail R Hymel
(74) *Attorney, Agent, or Firm* — Global IP Counselors, LLP

(57) ABSTRACT

A bulldozer includes a control unit for controlling left and right steering clutches and left and right steering brakes, thereby executing a turning control of the vehicle. The control unit switches between a clutch control and a brake control on the basis of a differential between an actual turning radius and a target turning radius.

8 Claims, 10 Drawing Sheets

(56) References Cited

U.S. PATENT DOCUMENTS

| | | | | |
|---|---|---|---|---|
| 1,691,062 A | * | 11/1928 | Henricks | B62D 11/08 192/13 R |
| 2,380,619 A | * | 7/1945 | Terrill | B66C 23/78 180/6.58 |
| 2,961,057 A | * | 11/1960 | Johnson | B62D 11/08 60/904 |
| 3,056,479 A | * | 10/1962 | Prior | F16D 48/0206 192/13 R |
| 3,080,026 A | * | 3/1963 | Koch | B62D 11/08 192/13 R |
| 3,620,319 A | * | 11/1971 | Armasow | B62D 11/183 180/6.7 |
| 3,895,703 A | * | 7/1975 | Schmitt | B62D 11/08 192/12 C |
| 3,964,562 A | * | 6/1976 | Kawamura | B62D 11/08 180/6.7 |
| 4,380,249 A | * | 4/1983 | Behlmer | F16D 67/04 192/12 C |
| 4,401,132 A | * | 8/1983 | Hakes | B60T 13/22 137/1 |
| 4,438,780 A | * | 3/1984 | Chatterjea | F16D 67/04 192/12 C |
| 4,467,900 A | * | 8/1984 | Shore | B62D 11/08 192/13 R |
| 4,702,358 A | * | 10/1987 | Mueller | B62D 11/08 180/6.7 |
| 5,325,933 A | * | 7/1994 | Matsushita | B62D 11/08 180/6.7 |
| 6,260,642 B1 | | 7/2001 | Yamamoto et al. | |
| 7,818,110 B2 | * | 10/2010 | Ishibashi | B62D 11/183 701/50 |
| 2002/0005302 A1 | * | 1/2002 | Hidaka | B62D 11/183 180/6.24 |
| 2002/0193927 A1 | | 12/2002 | Nakagawa et al. | |
| 2008/0070737 A1 | | 3/2008 | Shiohara | |
| 2014/0196961 A1 | | 7/2014 | Yoshikawa et al. | |
| 2015/0217805 A1 | | 8/2015 | Yoshikawa et al. | |
| 2018/0118261 A1 | * | 5/2018 | Sasada | B60W 10/06 |
| 2018/0148026 A1 | * | 5/2018 | York | B60T 8/1755 |

FOREIGN PATENT DOCUMENTS

| | | |
|---|---|---|
| CN | 103562521 A | 2/2014 |
| JP | 61-75062 A | 4/1986 |
| JP | 1-501054 A | 4/1989 |
| JP | 5-124537 A | 5/1993 |
| JP | 10-1062 A | 1/1998 |
| JP | 2000-142455 A | 5/2000 |
| JP | 2000-177618 A | 6/2000 |
| JP | 2001-310752 A | 11/2001 |
| JP | 2007-303519 A | 11/2007 |
| JP | 2009-74406 A | 4/2009 |

OTHER PUBLICATIONS

The International Search Report for the corresponding international application No. PCT/JP2020/025575, issued on Sep. 1, 2020.

The Office Action for the corresponding Japanese application No. 2021-542577, issued on Mar. 12, 2024.

* cited by examiner

CRAWLER-TYPE WORK MACHINE

CROSS-REFERENCE TO RELATED APPLICATIONS

This application is a U.S. National stage application of International Application No. PCT/JP2020/025575, filed on Jun. 29, 2020. This U.S. National stage application claims priority under 35 U.S.C. § 119(a) to Japanese Patent Application No. 2019-158994, filed in Japan on Aug. 30, 2019, the entire contents of which are hereby incorporated herein by reference.

BACKGROUND

Technical Field

The present disclosure relates to a crawler-type work machine.

Background Information

In a crawler-type work machine (e.g., a bulldozer), power from the engine is transmitted through a transmission to left and right drive wheels and left and right crawler belts are driven.

In this type of crawler-type work machine, turning to the left and right is executed by controlling the hydraulic pressure of left and right steering clutches and left and right steering brakes provided in correspondence to the left and right drive wheels.

For example, when slowly turning left during travel, the left steering clutch is partially engaged and the left steering brake is disengaged. In addition, when quickly turning left during travel, the left steering clutch is disengaged and the left steering brake is fully engaged or partially engaged.

In Japanese Patent Laid-open No. 2000-142455, a method is presented in which an actual turning radius is made to approximate a target turning radius by controlling the hydraulic pressure of the steering clutches and the steering brakes on the basis of a differential between an actual turning angle velocity and a target turning angle velocity. However, in the method described in Japanese Patent Laid-open No. 2000-142455, whether to disengage any of the steering clutches and the steering brakes is determined on the basis of a value of the target turning angle velocity set in accordance with the operating amount of the steering lever. As a result, it may become difficult to make the actual turning radius approximate the target turning radius during travel on sloped terrain or during dozing work.

Accordingly, Japanese Patent Laid-open No. 2000-177618 presents a method which involves selecting modulation characteristics of a steering clutch and a steering brake in accordance with a traveling state, such as travel on sloped terrain or during dozing work.

SUMMARY

However, in order to select the modulation characteristic suited to all traveling states in the method of Japanese Patent Laid-open No. 2000-177618, it is necessary not only to prepare a large number of modulation characteristics, but also to acquire a huge amount of input parameters for correctly determining the traveling state.

An object of the present disclosure is to provide a crawler-type work machine with which it is easy to cause an actual turning radius to approximate a target turning radius.

A crawler-type work machine according to an aspect of the present disclosure includes an engine, left and right drive wheels, a power transmission device, left and right steering clutches, left and right steering brakes, and a control unit. The left and right drive wheels are configured to drive left and right crawler belts. The power transmission device is configured to transmit power from the engine. The left and right steering clutches are respectively disposed between the power transmission device and the left and right drive wheels, and are configured to transmit or block the power. The left and right steering brakes are respectively disposed between the left and right steering clutches and the left and right drive wheels, and are configured to brake the rotation of the left and right drive wheels. The control unit is configured to execute a turning control of a vehicle by controlling the left and right steering clutches and the left and right steering brakes. The control unit is configured to switch between a clutch control and a brake control on the basis of a differential between an actual turning radius and a target turning radius, or a differential between an actual bearing and a target bearing.

According to the crawler-type work machine according to the present disclosure, it is easy to cause an actual turning radius to approximate a target turning radius.

DESCRIPTION OF EMBODIMENTS

[Configuration of Bulldozer 1]

Figure 1:
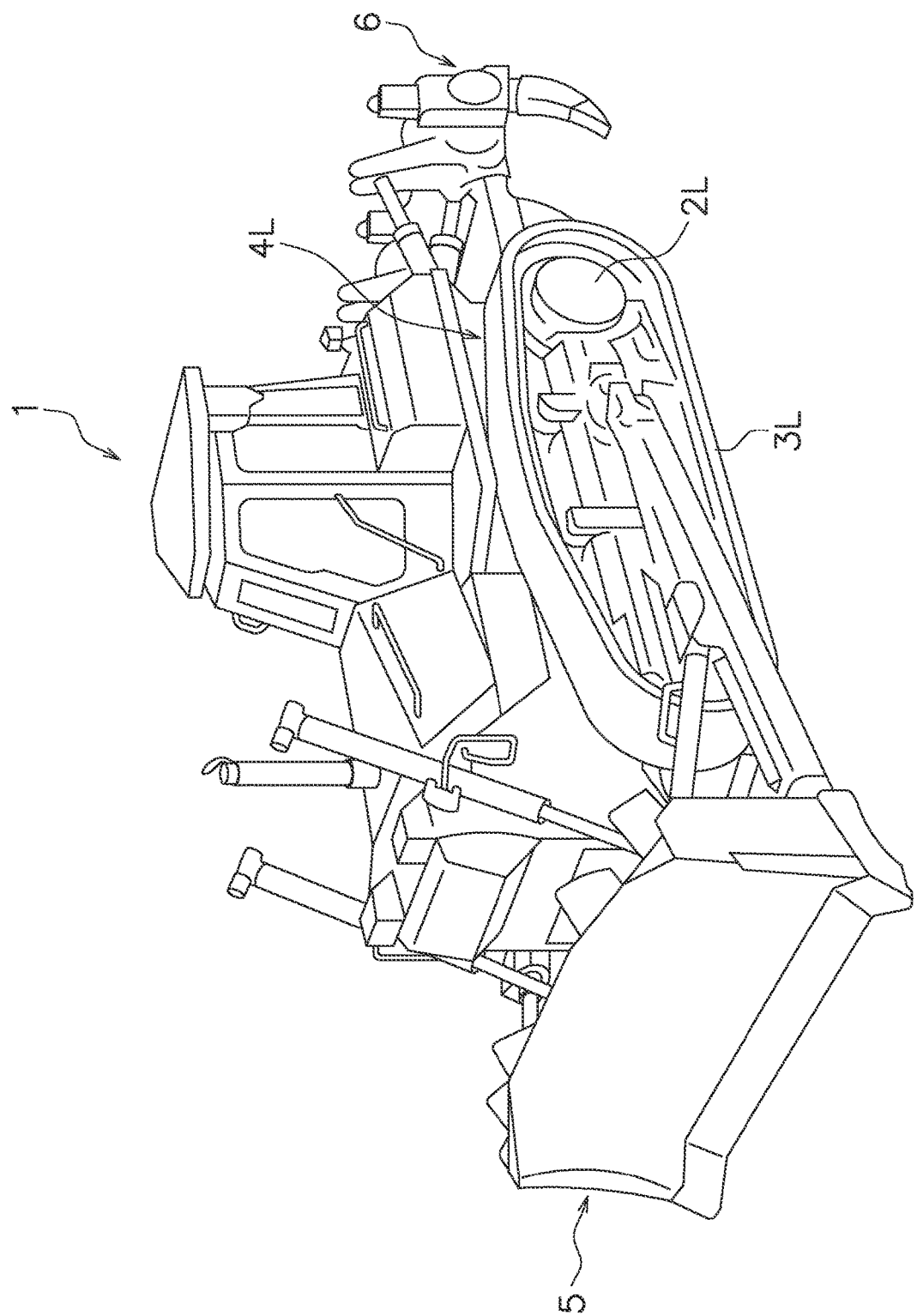
FIG. 1 is a perspective view of a bulldozer that is an example of a crawler-type work machine.

FIG. 1 is a perspective view of a bulldozer 1 that is an example of the crawler-type work machine.

The bulldozer 1 is equipped with left and right travel devices 4L, 4R that respectively have left and right sprockets 2L, 2R (examples of left and right drive wheels) and left and right crawler belts 3L, 3R; a blade 5 provided at a vehicle front portion, and a ripper device 6 provided at a vehicle rear portion.

The bulldozer 1 is able to do work, such as pushing earth, with the blade 5, and work, such as crushing and excavation, with the ripper device 6.

(Configuration of Power Transmission System)

Figure 2:
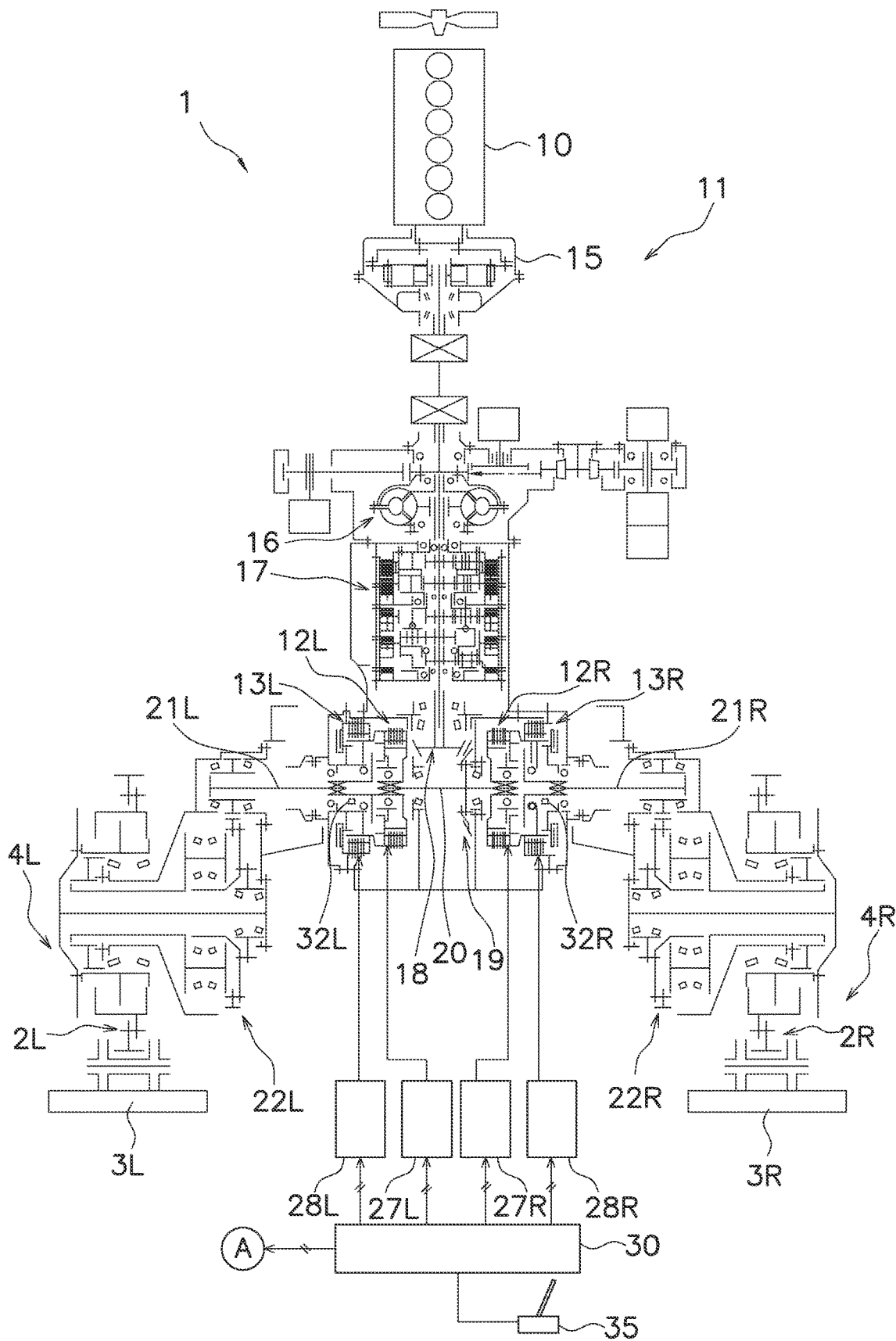
FIG. 2 is a schematic view illustrating a configuration of a power transmission system of the bulldozer.
Figure 3:
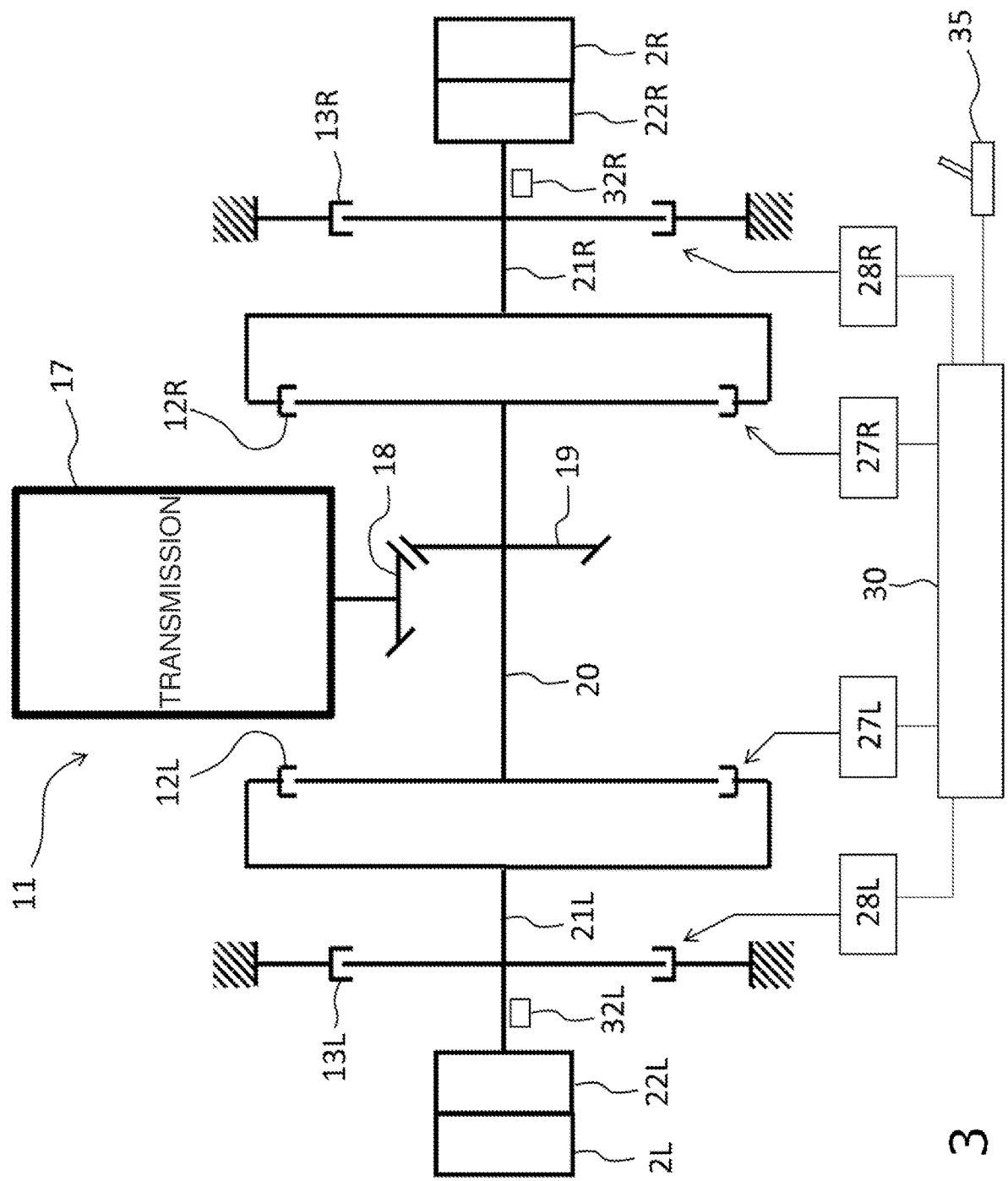
FIG. 3 is an outline system configuration diagram of the power transmission system of the bulldozer.

FIG. 2 is a schematic view illustrating a configuration of a power transmission system of the bulldozer 1. FIG. 3 is an outline system configuration diagram of the power transmission system of the bulldozer 1. However, an engine 10, a damper 15, and a torque converter 16 are omitted in FIG. 3.

The bulldozer 1 includes the engine 10, a power transmission device 11, left and right steering clutches 12L, 12R, left and right steering brakes 13L, 13R, and a control unit 30.

The power transmission device 11 transmits power from the engine 10. The power transmission device 11 includes the damper 15, the torque converter 16, a transmission 17, a pinion 18, a bevel gear 19, and a cross shaft 20. Power from the engine 10 is transmitted through the damper 15 to the torque converter 16 in the power transmission device 11. An output shaft of the torque converter 16 is coupled to an input shaft of the transmission 17 and power from the torque converter 16 is transmitted to the transmission 17. The power output by the transmission 17 is transmitted through the pinion 18 and the bevel gear 19 to the cross shaft 20.

The power transmitted to the cross shaft 20 is transmitted through the left steering clutch 12L, a left output shaft 21L, and a left final drive gear 22L to the left sprocket 2L, and is transmitted through the right steering clutch 12R, a right output shaft 21R, and a right final drive gear 22R to the right sprocket 2R.

The crawler belts 3L, 3R are respectively wound around the sprockets 2L, 2R. When the sprockets are rotated, the crawlers 3L, 3R are driven and consequently the bulldozer 1 travels.

The left and right steering clutches 12L, 12R respectively transmit or block the power from the power transmission device 11 to the left and right sprockets 2L, 2R. The left and right steering clutches 12L, 12R are each hydraulic clutches that can be switched by hydraulic pressure to an engaged state (i.e., a power transmission state) and a disengaged state (i.e., a power blocking state). Full engagement and partial engagement are included in the engagement of the left and right steering clutches 12L, 12R. When the left steering clutch 12L is engaged, power is transmitted from the bevel gear 19 to the left sprocket 2L. When the right steering clutch 12R is engaged, power is transmitted from the bevel gear 19 to the right sprocket 2R.

The supply and discharge of pressure oil to the left and right steering clutches 12L, 12R is controlled by steering clutch control valves 27L, 27R. The left and right steering clutches 12L, 12R are negative-type hydraulic clutches and are fully engaged when no hydraulic pressure is supplied, are partially engaged when the supplied hydraulic pressure is less than a predetermined value, and are disengaged when the supplied hydraulic pressure is equal to or greater than a predetermined value.

In the present embodiment, the left and right steering clutches 12L, 12R are respectively disposed between the power transmission device 11 and the left and right sprockets 2L, 2R.

The left and right steering brakes 13L, 13R respectively brake the rotation of the left and right sprockets 2L, 2R. The left and right steering brakes 13L, 13R are hydraulic brakes that can be switched between an engaged state (i.e., a braking state) and a disengaged state (i.e., a non-braking state) by hydraulic pressure. Full engagement and partial engagement are included in the engagement of the left and right steering brakes 13L, 13R. When the left steering brake 13L is engaged, braking is applied to the output rotation of the left steering clutch 12L, namely the rotation of the left sprocket 2L. When the right steering brake 13R is engaged, braking is applied to the output rotation of the right steering clutch 12R, namely the rotation of the right sprocket 2R.

The supply and discharge of pressure oil to the left and right steering brakes 13L, 13R is respectively controlled by brake control valves 28L, 28R. The left and right steering brakes 13L, 13R are constant braking-type hydraulic brakes and are fully engaged when no hydraulic pressure is supplied, are partially engaged when the supplied hydraulic pressure is less than a predetermined value, and are disengaged when the supplied hydraulic pressure is equal to or greater than a predetermined value.

In the present embodiment, the left and right steering brakes 13L, 13R are respectively disposed between the left and right steering clutches 12L, 12R and the left and right sprockets 2L, 2R.

Left and right rotation speed detecting sensors 32L, 32R are respectively provided on the output side of the left and right steering brakes 13L, 13R. The Left and right rotation speed detecting sensors 32L, 32R detect the output rotation of the left and right steering brakes 13L, 13R. The left and right rotation speed detecting sensors 32L, 32R transmit the detected output rotation speeds to the control unit 30.

The control unit 30 acquires a steering command from a steering lever 35 used in a steering operation by an operator. The control unit 30 executes a turning control of the vehicle in response to the operation of the steering lever 35 by the operator. Specifically, the control unit 30 sets the turning direction (left direction or right direction) in response to the operating direction of the steering lever 35 and also sets a target turning radius Ra in response to the operating amount of the steering lever 35 when the steering lever 35 is operated. The control unit 30 controls the left and right steering clutches 12L, 12R and the left and right steering brakes 13L, 13R via the respective clutch control valves 27L, 27R and the respective brake control valves 28L, 28R so that the vehicle turns toward the set turning direction by the set target turning radius Ra.

The control unit 30 calculates an actual turning radius Rb of the vehicle on the basis of the output rotation speed of the left and right steering brakes 13L, 13R acquired respectively from the left and right rotation speed detecting sensors 32L, 32R during the execution of the turning control. The control unit 30 then automatically switches the turning by means of the control (referred to below as "clutch control") of either of the left and right steering clutches 12L, 12R and the turning by means of the control (referred to below as "brake control") of either of the left and right steering brakes 13L, 13R, on the basis of a differential OR between the actual turning radius Rb and the target turning radius Ra.

In the present description, the turning by means of the clutch control is abbreviated as "clutch control mode." In the clutch control mode, one steering clutch positioned on the turning direction side among the left and right steering clutches 12L, 12R is partially engaged, and one steering brake positioned on the turning direction side among the left and right steering brakes 13L, 13R is disengaged. Additionally, in the clutch control mode, the other steering clutch positioned on the opposite side of the turning direction among the left and right steering clutches 12L, 12R is fully engaged, and the other steering brake positioned on the opposite side of the turning direction among the left and right steering brakes 13L, 13R is disengaged. In the clutch control mode, the adjustment of the actual turning radius Rb is performed by controlling the degree of engagement of one of the steering clutches. The clutch control mode is mainly used when the actual turning radius Rb is smaller than the target turning radius Ra.

In the present description, turning by means of the brake control is abbreviated as "brake control mode." In the brake control mode, one steering clutch positioned on the turning direction side among the left and right steering clutches 12L, 12R is disengaged, and one steering brake positioned on the turning direction side among the left and right steering brakes 13L, 13R is fully engaged or partially engaged. In the brake control mode, the adjustment of the actual turning radius Rb is performed by controlling the degree of engagement of one of the steering brakes. The brake control mode is mainly used when the actual turning radius Rb is greater than the target turning radius Ra.

Figure 4:
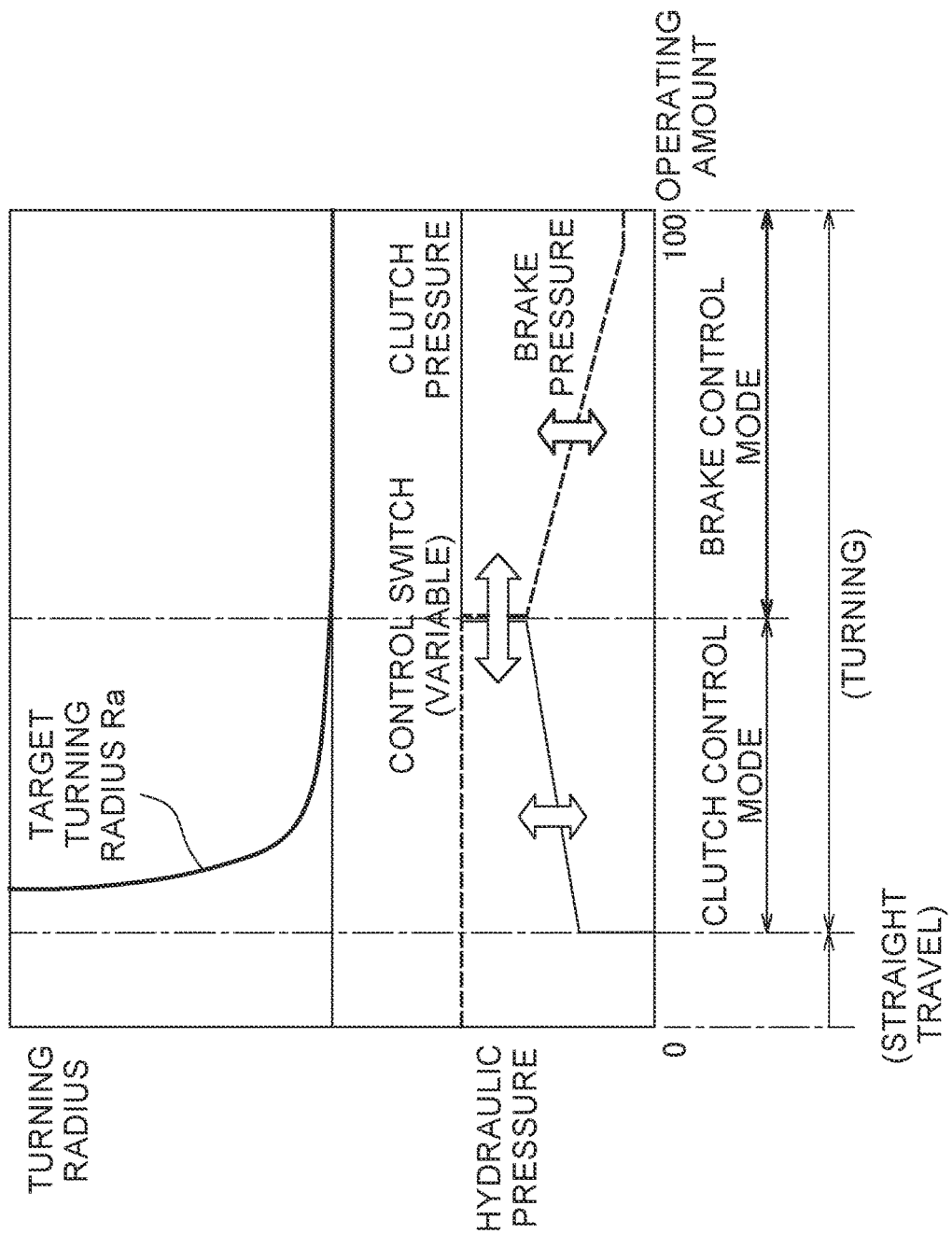
FIG. 4 is a schematic view for explaining a turning control by a control unit.

As illustrated in FIG. 4, the control unit 30 then adjusts the hydraulic pressure of the one steering clutch or the one steering brake so that the actual turning radius Rb approaches the target turning radius Ra on the basis of the differential ΔR between the actual turning radius Rb and the target turning radius Ra while executing the turning control by automatically switching between the clutch control mode and the brake control mode.

Figure 5:
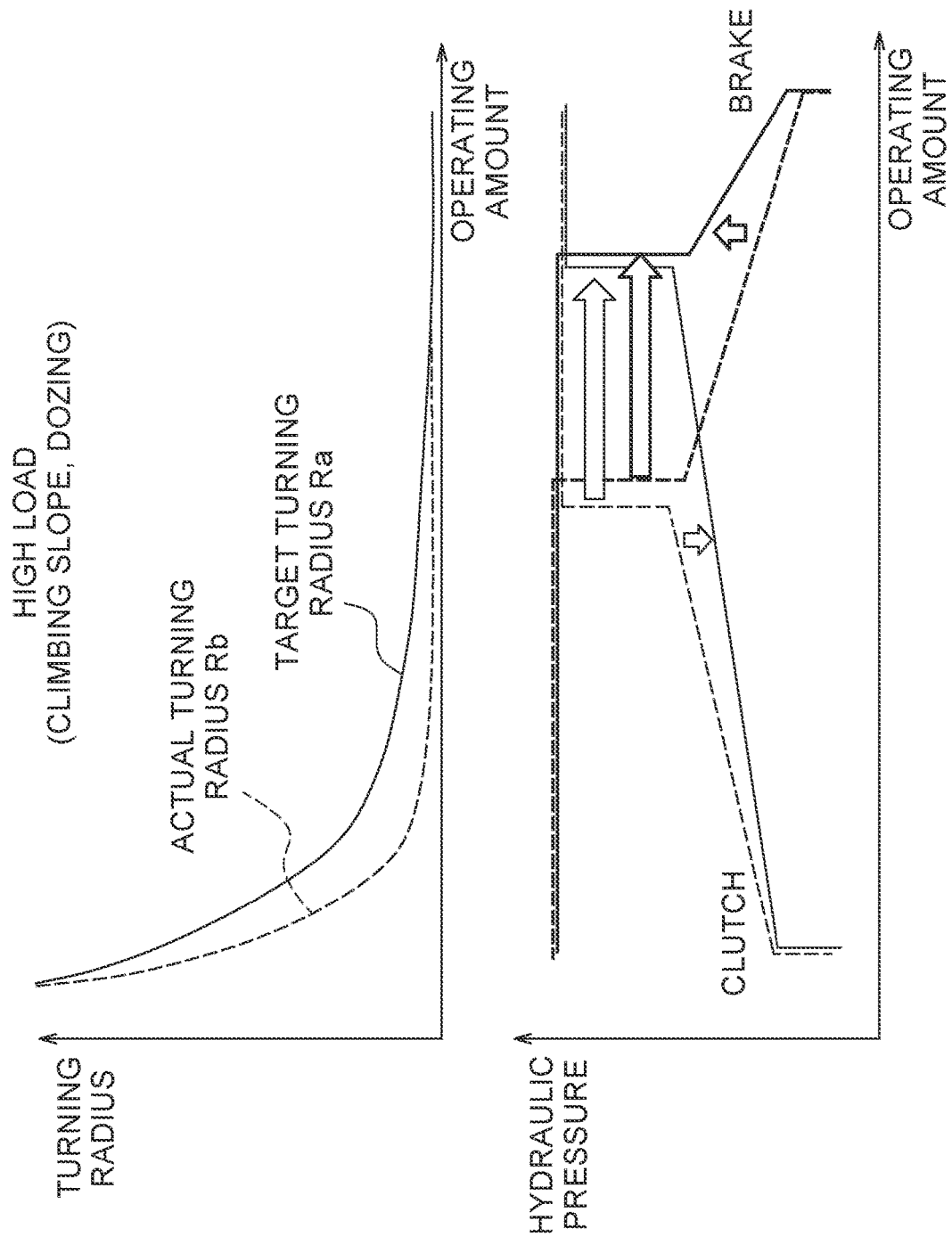
FIG. 5 is a schematic view for explaining the turning control by the control unit in a high load state.

Specifically, as illustrated in FIG. 5, the actual turning radius Rb is likely to be smaller than the target turning radius Ra during a high load state, such as climbing a slope or during dozing. In this case, the control unit 30 is able to make the actual turning radius Rb approach the target turning radius Ra with high accuracy by switching from the clutch control mode to the brake control mode at a timing later than the timing for switching from the clutch control mode to the brake control mode determined according to the operating amount of the steering lever 35. At this time, the slope of the clutch pressure with respect to the operating amount of the steering lever 35 becomes smaller and the slope of the brake pressure with respect to the operating amount of the steering lever 35 becomes greater.

Figure 6:
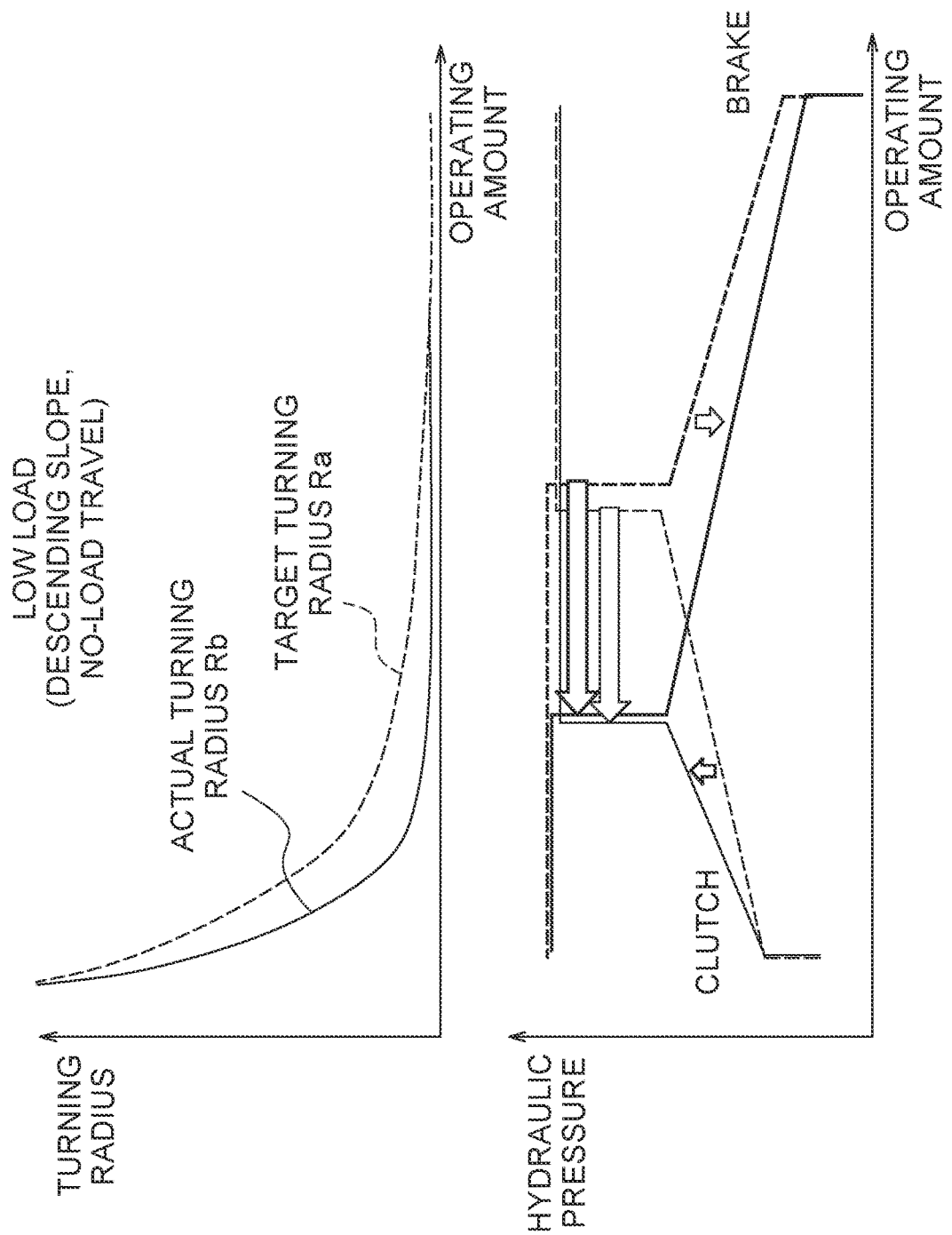
FIG. 6 is a schematic view for explaining the turning control by the control unit in a low load state.

In addition, as illustrated in FIG. 6, the actual turning radius Rb is likely to be greater than the target turning radius Ra during a low load state, such as descending a slope or no-load traveling. In this case, the control unit 30 is able to make the actual turning radius Rb approach the target turning radius Ra with high accuracy by switching from the clutch control mode to the brake control mode at a timing earlier than the timing for switching from the clutch control mode to the brake control mode determined according to the operating amount of the steering lever 35. At this time, the slope of the clutch pressure with respect to the operating amount of the steering lever 35 becomes greater and the slope of the brake pressure with respect to the operating amount of the steering lever 35 becomes smaller.

[Turning Control]

Figure 7A:
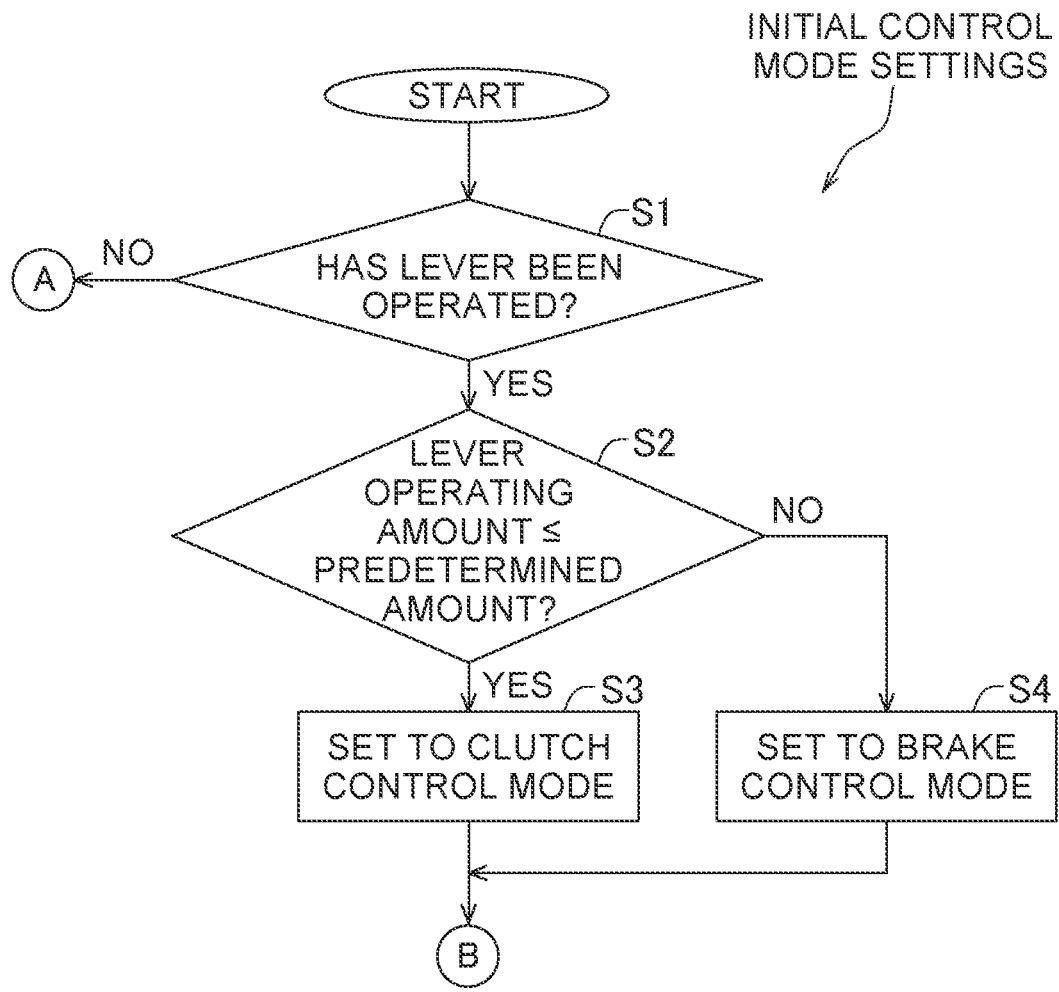
FIG. 7A is a flow chart for explaining initial control mode settings.
Figure 7B:
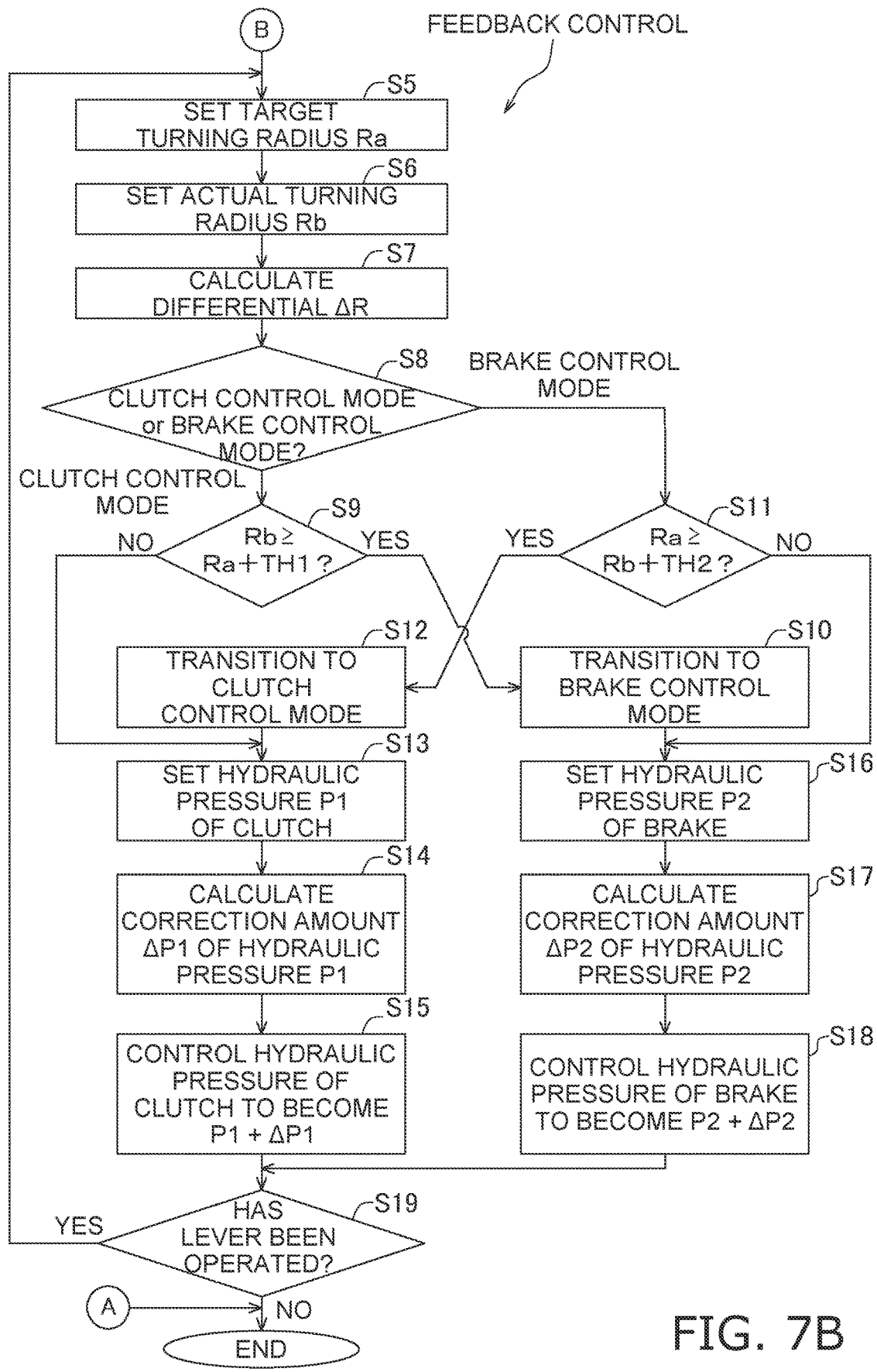
FIG. 7B is a flow chart for explaining a feedback control.

The turning control performed by the control unit 30 will be explained next with reference to the drawings. FIG. 7A is a flowchart for explaining initial control mode settings. FIG. 7B is a flowchart for explaining a feedback control. The following turning control starts while the vehicle is traveling in a straight line.

In step S1, the control unit 30 determines whether the steering lever 35 has been operated in the right turning direction or the left turning direction. When the steering lever 35 is not operated, the processing is completed. When the steering lever 35 is operated, the processing advances to step S2.

In step S2, the control unit 30 control unit determines whether the operating amount of the steering lever 35 is equal to or less than a predetermined amount. When the operating amount is equal to or less than the predetermined amount, the processing advances to step S3, and the control unit 30 sets the control mode of the turning control to the clutch control mode. When the operating amount is not equal to or less than the predetermined amount, the processing advances to step S4, and the control unit 30 sets the control mode of the turning control to the brake control mode.

In step S5, the control unit 30 sets the target turning radius Ra on the basis of the operating amount of the steering lever 35.

In step S6, the control unit 30 calculates the actual turning radius Rb of the vehicle on the basis of the output rotation speed of the left and right steering brakes 13L, 13R acquired from the left and right rotation speed detecting sensors 32L, 32R. The actual turning radius Rb can be calculated with the following equation (1).

$$R_b = \frac{B}{2} \cdot \frac{V_2 + V_1}{V_2 - V_1} \quad (1)$$

In equation (1), B is the interval between vehicle width direction center parts of the crawlers belts 3L, 3R in the vehicle width direction, V1 is the travel velocity of the crawler belt on the turning direction side, and V2 is the travel velocity of the crawler belt on the side opposite to the turning direction.

In step S7, the control unit 30 calculates the differential ΔR by subtracting the target turning radius Ra from the actual turning radius Rb.

In step S8, the control unit 30 determines whether the control mode of the turning control is to be the clutch control mode or the brake control mode.

When it is determined that the control mode of the turning control is the clutch control mode in step S8, the processing advances to step S9 and the control unit 30 determines whether the actual turning radius Rb is greater than the target turning radius Ra by at least a first threshold TH1. The first threshold TH1 is set, for example, on the basis of the ratio of the differential ΔR with respect to the target turning radius Ra. The first threshold TH1 is set to be a value greater than zero. The transition from the clutch control mode to the brake control mode is performed with correspondingly greater accuracy as the first threshold TH1 decreases, and hysteresis is correspondingly applied to the transition from the clutch control mode to the brake control mode as the first threshold TH1 increases, and hunting is suppressed.

When the actual turning radius Rb is determined to be greater than the target turning radius Ra by at least the first threshold TH1 in step S9, the processing advances to step S10 and the control unit 30 transitions the control mode of the turning control from the clutch control mode to the brake control mode. When the actual turning radius Rb is determined not to be greater than the target turning radius Ra by at least the first threshold TH1 in step S9, the processing advances to step S13.

When it is determined that the control mode of the turning control is the brake control mode in step S8, the processing advances to step S11 and the control unit 30 determines whether the target turning radius Ra is greater than the actual turning radius Rb by at least a second threshold TH2. The second threshold TH2 is set, for example, on the basis of the ratio of the differential ΔR with respect to the target turning radius Ra. The second threshold TH2 is set to a value greater than zero. The transition from the brake control mode to the clutch control mode is performed with correspondingly greater accuracy as the second threshold TH2 decreases, and hysteresis is correspondingly applied to the transition from the brake control mode to the clutch control mode as the second threshold TH2 increases, and hunting is suppressed.

When it is determined that the target turning radius Ra is greater than the actual turning radius Rb by at least the second threshold TH2 in step S11, the processing advances to step S12 and the control unit 30 transitions the control mode of the turning control from the brake control mode to the clutch control mode. When the target turning radius Ra is determined not to be greater than the actual turning radius Rb by at least the second threshold TH2 in step S11, the processing advances to step S16.

When the processing has advanced from step S9 to step S13 or when the processing has advanced from step S12 to step S13, the control unit 30 sets a hydraulic pressure P1 of the one steering clutch positioned on the turning direction side among the left and right steering clutches 12L, 12R on the basis of the operating amount of the steering lever 35.

In step S14, the control unit 30 calculates a correction amount ΔP1 of the hydraulic pressure P1 by multiplying the differential ΔR by a predetermined gain. However, the correction amount ΔP1 only needs to be determined on the basis of the differential ΔR and the calculation method of the correction amount ΔP1 is not limited in particular.

In step S15, the control unit 30 controls one of the clutch control valves 27L, 27R so that the hydraulic pressure of the one steering clutch becomes P1+ΔP1. As a result, the degree of engagement of the one steering clutch is controlled so that the differential ΔR decreases.

When the processing has advanced from step S11 to step S16 or when the processing has advanced from step S10 to step S16, the control unit 30 sets a hydraulic pressure P2 of the one steering brake positioned on the turning direction side among the left and right steering brakes 13L, 13R on the basis of the operating amount of the steering lever 35.

In step S17, the control unit 30 calculates a correction amount ΔP2 of the hydraulic pressure P2 by multiplying the differential ΔR by a predetermined gain. However, the correction amount ΔP2 only needs to be determined on the basis of the differential ΔR and the calculation method of the correction amount ΔP2 is not limited in particular.

In step S18, the control unit 30 controls one of the brake control valves 28L, 28R so that the hydraulic pressure of the one steering brake becomes P2+ΔP2. As a result, the degree of engagement of the one steering brake is controlled so that the differential ΔR decreases The control of the degree of engagement of the one steering clutch in steps S13 to S15 and the control of the degree of engagement of the one steering brake in steps S16 to S18 are disclosed in detail in JP 2000-142455.

After step S15 or step S18 is completed, the processing advances to step S19 and the control unit 30 determines whether the steering lever 35 has been operated in the right turning direction or the left turning direction. When the steering lever 35 is not operated, the processing is completed. When the steering lever 35 is operated, the processing returns to step S5 and the control unit 30 repeats the abovementioned switching of the control modes and the control of the degree of engagement.

The bulldozer 1 according to the present embodiment comprises the control unit 30 for controlling the left and right steering clutches 12L, 12R and the left and right steering brakes 13L, 13R, thereby executing the turning control of the vehicle with the clutch control mode or the brake control mode. The control unit 30 switches the clutch control mode and the brake control mode on the basis of the differential ΔR between the actual turning radius Rb and the target turning radius Ra.

Figure 8A:
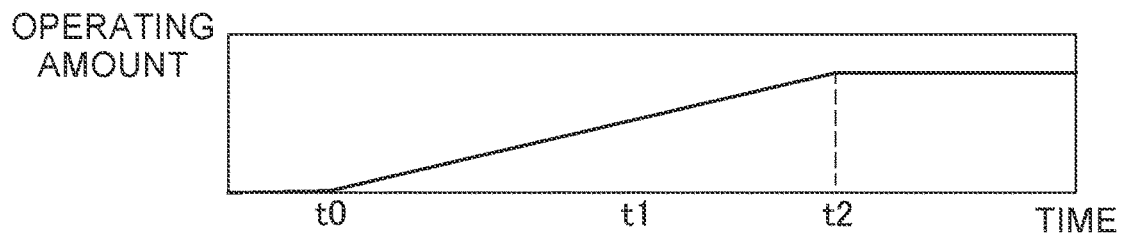
FIG. 8A is a diagram for explaining a situation for transitioning from a clutch control mode to a brake control mode illustrating an operating amount of the steering lever.
Figure 8B:
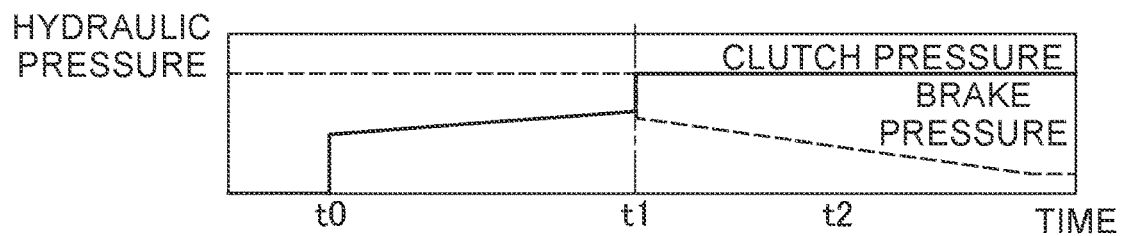
FIG. 8B is a diagram for explaining a situation for transitioning from the clutch control mode to the brake control mode illustrating hydraulic pressures of the steering clutch and the steering brake positioned on a turning direction side.
Figure 8C:
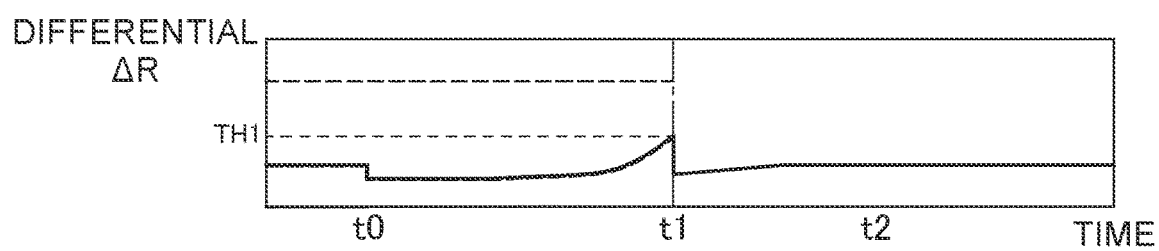
FIG. 8C is a diagram for explaining a situation for transitioning from the clutch control mode to the brake control mode illustrating a differential between an actual turning radius and a target turning radius.
Figure 8D:
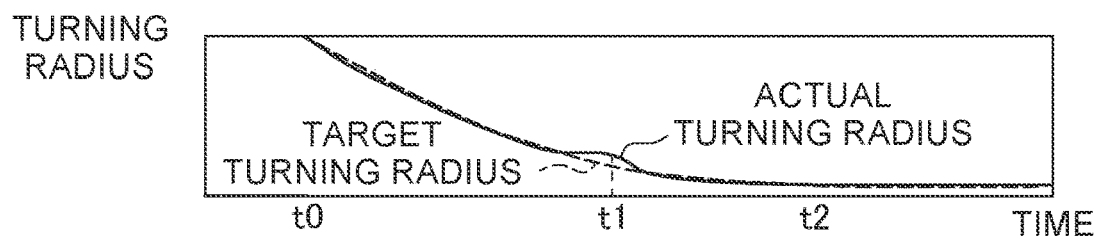
FIG. 8D is a diagram for explaining a situation for transitioning from the clutch control mode to the brake control mode illustrating temporal changes of the target turning radius and the actual turning radius.

FIG. 8A to 8D are diagrams for explaining a situation for transitioning the control mode of the turning control from the clutch control mode to the brake control mode. FIG. 8A is a graph illustrating the operating amount of the steering lever 35. FIG. 8B is a graph illustrating the hydraulic pressures of the steering clutch and the steering brake positioned on the turning direction side. FIG. 8C is a graph illustrating temporal changes of the differential ΔR. FIG. 8D is a graph illustrating temporal changes of the target turning radius Ra and the actual turning radius Rb.

According to the bulldozer 1 according to the present embodiment, when the operating amount of the steering lever 35 gradually increases from time t0 to time t2 as illustrated in FIG. 8A, the control mode of the turning control automatically transitions from the clutch control mode to the brake control mode at the time t1 where the actual turning radius Rb becomes greater than the target turning radius Ra by at least the first threshold Th1 as illustrated in FIGS. 8B and 8C. As a result, the actual turning radius Rb can be made to approximate the target turning radius Ra easily and smoothly as illustrated in FIG. 8D.

The present invention is not limited to the above embodiment and various changes and modifications may be made without departing from the spirit of the invention.

Modified Example 1

While the bulldozer 1 comprises the steering lever 35 in the above embodiment, the bulldozer 1 may not be provided with the steering lever 35 when the bulldozer 1 is operated in an unmanned remote manner. In this case, information indicating the target turning radius Ra may be input directly to the control unit 30.

Modified Example 2

While the control unit 30 in the above embodiment calculates the actual turning radius Rb on the basis of the output rotation speeds of the left and right steering brakes 13L, 13R, the present invention is not limited in this way. The control unit 30 may also calculate the actual turning radius Rb by using an inertial measurement unit (IMU), a global positioning system (GPS), an acceleration sensor, a gyroscope sensor, a yaw rate sensor, an azimuth sensor, or the like.

Modified Example 3

While the control unit 30 switches the clutch control mode and the brake control mode by using the differential ΔR between the actual turning radius Rb and the target turning radius Ra in the above embodiment, the present invention is not limited in this way. The switching of the control mode may be executed by using a differential Δ between an actual bearing and a target bearing prescribed in a global coordinate system. The actual bearing can be acquired from GNSS radio waves.

Modified Example 4

While a configuration of the bulldozer 1 was explained as an example of a crawler-type work machine in the above embodiment, the crawler-type work machine may be any type of crawler-type work machine comprising steering clutches and steering brakes such as a crawler-type hydraulic excavator or a crawler-type loader.

Modified Example 5

While the left and right steering clutches 12L, 12R are respectively disposed between the power transmission device 11 and the left and right sprockets 2L, 2R, and the left and right steering brakes 13L, 13R are respectively disposed between the left and right steering clutches 12L, 12R and the left and right sprockets 2L, 2R in the above embodiment, the present invention is not limited in this way. The left and right steering clutches 12L, 12R only need to be able to transmit or block the power from the power transmission device 11 to the left and right sprockets 2L, 2R, and the left and right steering brakes 13L, 13R only need to be able to brake the rotation of the left and right sprockets 2L, 2R.

Figure 9:
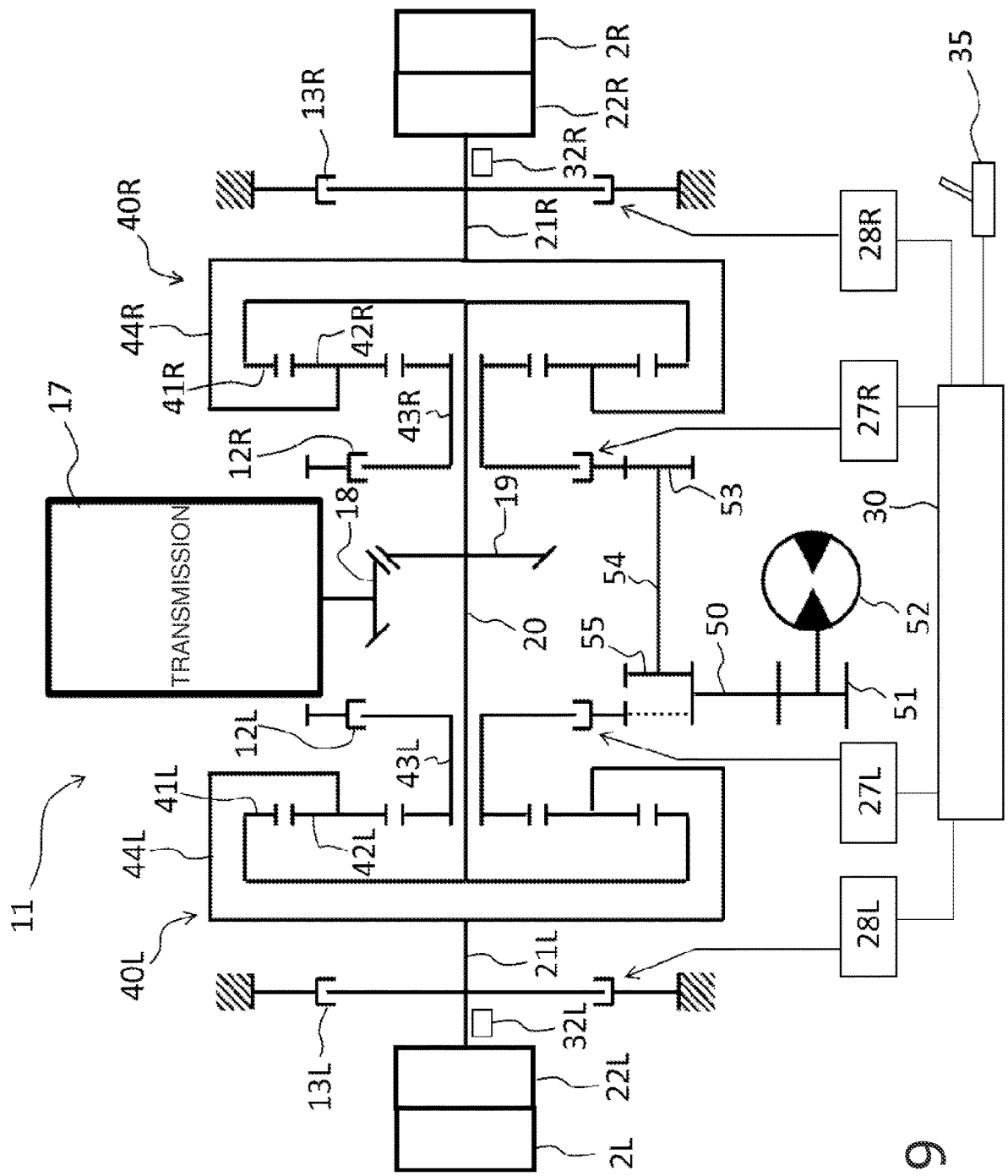
FIG. 9 is an outline system configuration diagram of the power transmission system according to modified example 5.

For example, as illustrated in FIG. 9, left and right planetary gear mechanisms 40L, 40R may be respectively disposed between the power transmission device 11 and the left and right sprockets 2L, 2R, and the left and right steering brakes 13L, 13R may be respectively disposed between the left and right planetary gear mechanisms 40L, 40R and the left and right sprockets 2L, 2R.

The left and right planetary gear mechanisms 40L, 40R respectively have left and right ring gears 41L, 41R, left and right planetary gears 42L, 42R, left and right sun gears 43L, 43R, and left and right carriers 44L, 44R.

The left and right steering clutches 12L, 12R can be respectively engaged or disengaged with the left and right sun gears 43L, 43R. When the left steering clutch 12L is engaged with the left sun gear 34L and the left sun gear 43L enters a braking state, the rotation of the cross shaft 20 is transmitted to the left output shaft 21L via the left ring gear 41L, the left planetary gear 42L, and the left carrier 44L. When the left steering clutch 12L is disengaged with the left sun gear 43L and the left sun gear 43L enters a freely rotating state, the rotation of the cross shaft 20 is not transmitted to the left output shaft 21L. In this way, the left steering clutch 12L is able to transmit or block power from the power transmission device 11 to the left sprocket 2L. Similarly, the right steering clutch 12R is able to transmit or block power from the power transmission device 11 to the right sprocket 2R.

The left steering clutch 12L in the example illustrated in FIG. 9 is coupled to a motor 52 through an idler gear 50 and a pinion gear 51, and the right steering clutch 12R is coupled to the motor 52 through a first transfer gear 53, a counter shaft 54, a second transfer gear 55, the idler gear 50, and the pinion gear 51. When the left and right steering clutches 12L, 12R are engaged, the rotation power of the motor 52 is transmitted to the left and right sun gears 43L, 43R through the left and right steering clutches 12L, 12R, and the work machine is able to perform gentle turning or pivot turning due to the left and right sun gears 43L, 43R rotating in opposite directions.

However, the motor 52 is an optional configuration item. At least one of the idler gear 50 and the pinion gear 51 may be fixed if no motor 52 is installed.

What is claimed is:

1. A work machine comprising:
an engine;
left and right crawler belts;
left and right drive wheels configured to drive the left and right crawler belts;
a power transmission device configured to transmit power of the engine to the left and right drive wheels;
left and right steering clutches respectively disposed between the power transmission device and the left and right drive wheels, the left and right steering clutches being configured to transmit or block transmission of the power;
left and right steering brakes respectively disposed between the left and right steering clutches and the left and right drive wheels, the left and right steering brakes being configured to brake rotation of the left and right drive wheels; and
a control unit configured to execute a turning control of the work machine by controlling the left and right steering clutches and the left and right steering brakes,
the control unit being configured to switch between a clutch control and a brake control in accordance with a differential between an actual turning radius and a target turning radius, or a differential between an actual bearing and a target bearing,
the actual turning radius being calculated based on output rotation speeds of the left and right steering brakes.

2. The work machine according to claim 1, wherein
during the clutch control, the control unit is configured to cause one of the left and right steering clutches to be partially engaged and cause one of the left and right steering brakes to be disengaged, the one steering clutch being positioned on a turning direction side among the left and right steering clutches, the one steering brake being positioned on the turning direction side among the left and right steering brakes; and
during the brake control, the control unit is configured to cause the one steering clutch to be disengaged and cause the one steering brake to be fully engaged or partially engaged.

3. The work machine according to claim 2, wherein
the control unit,
when executing the turning control with the clutch control, transitions from the clutch control to the brake control when the actual turning radius is greater than the target turning radius by at least a first threshold, and
when executing the turning control with the brake control, transitions from the brake control to the clutch control when the target turning radius is greater than the actual turning radius by at least a second threshold.

4. The work machine according to claim 1, wherein
the target turning radius is set in accordance with an operating amount of a steering lever used during a steering operation by an operator.

5. A work machine comprising:
an engine;
left and right crawler belts;
left and right drive wheels configured to drive the left and right crawler belts;
a power transmission device configured to transmit power of the engine to the left and right drive wheels;

left and right steering clutches configured to respectively transmit or block the power transmitted from the power transmission device to the left and right drive wheels;

left and right steering brakes configured to respectively brake rotation of the left and right drive wheels; and a control unit configured to execute a turning control of the work machine by controlling the left and right steering clutches and the left and right steering brakes, the control unit being configured to switch between a clutch control and a brake control in accordance with a differential between an actual turning radius and a target turning radius, or a differential between an actual bearing and a target bearing, the actual turning radius being calculated based on output rotation speeds of the left and right steering brakes.

6. The work machine according to claim 5, wherein during the clutch control, the control unit is configured to cause one of the left and right steering clutches to be partially engaged and cause one of the left and right steering brakes to be disengaged, the one steering clutch being positioned on a turning direction side among the left and right steering clutches, the one steering brake being positioned on the turning direction side among the left and right steering brakes; and during the brake control, the control unit is configured to cause the one steering clutch to be disengaged and cause the one steering brake to be fully engaged or partially engaged.

7. The work machine according to claim 6, wherein the control unit, when executing the turning control with the clutch control, transitions from the clutch control to the brake control when the actual turning radius is greater than the target turning radius by at least a first threshold, and when executing the turning control with the brake control, transitions from the brake control to the clutch control when the target turning radius is greater than the actual turning radius by at least a second threshold.

8. The work machine according to claim 5, wherein the target turning radius is set in accordance with an operating amount of a steering lever used during a steering operation by an operator.

* * * * *